United States Patent
Nihei et al.

(10) Patent No.: US 7,973,817 B2
(45) Date of Patent: *Jul. 5, 2011

(54) PIXEL CLOCK AND PULSE-MODULATION-SIGNAL GENERATING DEVICE, OPTICAL SCANNER, AND IMAGE FORMING APPARATUS

(75) Inventors: Yasuhiro Nihei, Tokyo (JP); Masaaki Ishida, Tokyo (JP); Atsufumi Omori, Tokyo (JP); Dan Ozasa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 656 days.

This patent is subject to a terminal disclaimer.

(21) Appl. No.: 11/844,854

(22) Filed: Aug. 24, 2007

(65) Prior Publication Data

US 2008/0012933 A1 Jan. 17, 2008

Related U.S. Application Data

(63) Continuation of application No. 11/030,419, filed on Jan. 7, 2005, now Pat. No. 7,327,379.

(30) Foreign Application Priority Data

Jan. 7, 2004 (JP) ................................. 2004-001982

(51) Int. Cl.
*B41J 2/435* (2006.01)
(52) U.S. Cl. ........................................................ 347/249
(58) Field of Classification Search .................. 347/135, 347/229, 248–250, 234–235, 239
See application file for complete search history.

(56) References Cited

U.S. PATENT DOCUMENTS

| 5,117,243 | A | 5/1992 | Swanberg et al. |
| 5,548,321 | A | 8/1996 | Murakami et al. |
| 5,933,184 | A | 8/1999 | Ishigami et al. |
| 6,091,891 | A | 7/2000 | Overall et al. |
| 6,731,317 | B2 * | 5/2004 | Ema et al. ............ 347/135 |
| 6,791,596 | B2 | 9/2004 | Nihei et al. |
| 6,806,894 | B2 | 10/2004 | Seki |
| 6,927,789 | B2 | 8/2005 | Ozasa et al. |
| 7,327,379 | B2 * | 2/2008 | Nihei et al. ............ 347/247 |
| 2002/0085241 | A1 | 7/2002 | Izumuya et al. |
| 2002/0180719 | A1 | 12/2002 | Nangi et al. |
| 2003/0025785 | A1 | 2/2003 | Nihei et al. |
| 2003/0067533 | A1 | 4/2003 | Omori et al. |
| 2003/0156184 | A1 | 8/2003 | Suzuki et al. |

(Continued)

FOREIGN PATENT DOCUMENTS

JP 10-67141 3/1998

(Continued)

*Primary Examiner* — Hai C Pham
(74) *Attorney, Agent, or Firm* — Oblon, Spivak, McClelland, Maier & Neustadt, L.L.P.

(57) ABSTRACT

A pixel clock and pulse-modulation-signal generating device includes a high-frequency-clock generating unit that generates a high-frequency clock; a modulation-data generating unit that generates, based on pixel control data that specifies a pixel length and image data, phase data that indicates a transition timing of a pixel clock and modulation data that indicates a desired bit pattern that corresponds to the image data; a pixel-clock generating unit that generates a pixel clock based on the high-frequency clock, the phase data, and a horizontal synchronization signal; and a serial-modulation-signal generating unit that inputs the modulation data, and outputs a pulse modulation signal in a serial pulse string based on the high-frequency clock.

9 Claims, 11 Drawing Sheets

U.S. PATENT DOCUMENTS

| | | |
|---|---|---|
| 2003/0179428 A1 | 9/2003 | Susuki et al. |
| 2003/0209660 A1 | 11/2003 | Kanno |
| 2004/0032482 A1 | 2/2004 | Ozasa et al. |
| 2004/0036762 A1 | 2/2004 | Nihei et al. |
| 2004/0125199 A1 | 7/2004 | Omori et al. |
| 2004/0160506 A1 | 8/2004 | Maeda |
| 2004/0246329 A1 | 12/2004 | Yoshida |

FOREIGN PATENT DOCUMENTS

| | | |
|---|---|---|
| JP | 11-167081 | 6/1999 |
| JP | 2001-228415 | 8/2001 |
| JP | 2003-15068 | 1/2003 |
| JP | 2003-34051 | 2/2003 |
| JP | 2003-98465 | 4/2003 |
| JP | 2003-103830 | 4/2003 |
| JP | 2003-103831 | 4/2003 |
| JP | 2003-185953 | 7/2003 |
| JP | 2003-279873 | 10/2003 |
| JP | 2003-300341 | 10/2003 |
| JP | 2003-320702 | 11/2003 |
| JP | 2003-322810 | 11/2003 |
| JP | 2003-344790 | 12/2003 |
| JP | 3512397 | 1/2004 |
| JP | 2004-117557 | 4/2004 |
| JP | 2004-237663 | 8/2004 |

* cited by examiner

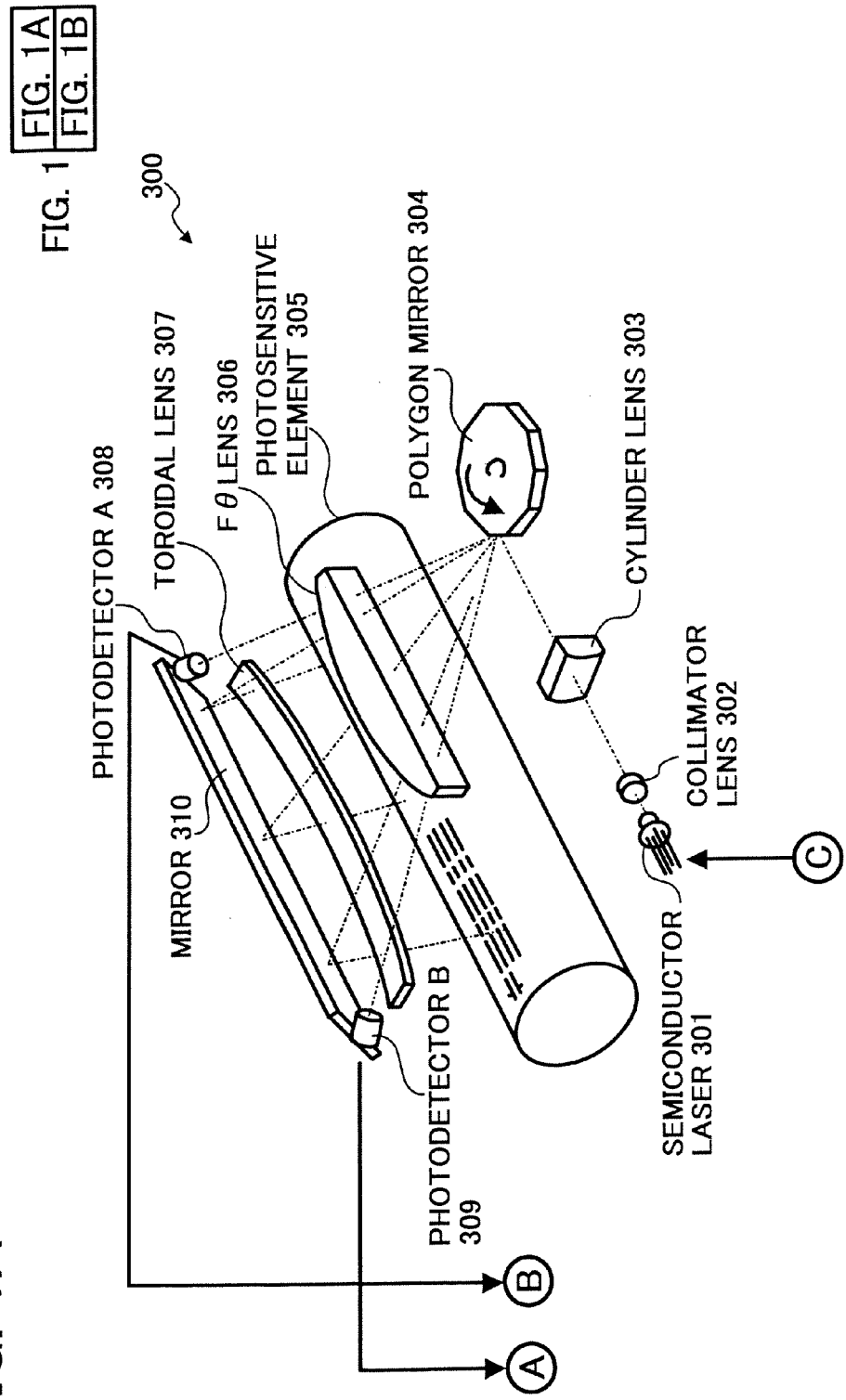

FIG. 5A
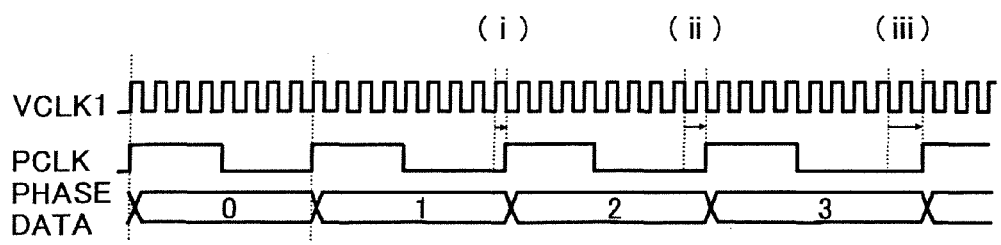
FIG. 5B
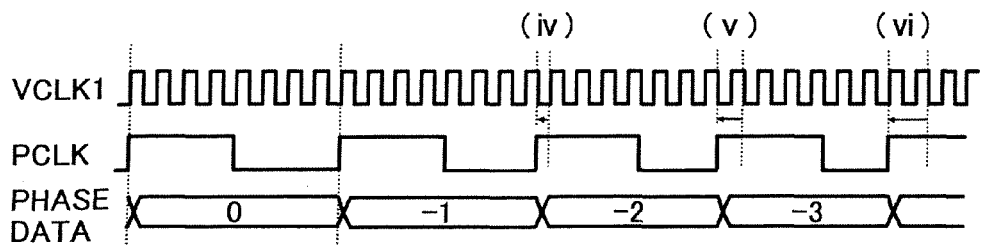
FIG. 6
| PHASE DATA | PHASE SHIFT AMOUNT |
|---|---|
| 0 | 0 |
| 1 | ADVANCE BY 1/16 PCLK |
| 2 | ADVANCE BY 2/16 PCLK |
| 3 | ADVANCE BY 3/16 PCLK |
| −1 | DELAY BY 1/16 PCLK |
| −2 | DELAY BY 2/16 PCLK |
| −3 | DELAY BY 3/16 PCLK |

| PHASE DATA | MODULATION DATA OUTPUT AS PM SIGNAL |
|---|---|
| 0 | D0~D31 (32-BITS) |
| 1 | D0~D33 (34-BITS) |
| 2 | D0~D35 (36-BITS) |
| 3 | D0~D37 (38-BITS) |
| -1 | D0~D29 (30-BITS) |
| -2 | D0~D27 (28-BITS) |
| -3 | D0~D25 (26-BITS) |

| PIXEL CONTROL DATA | LENGTH OF ONE PIXEL |
|---|---|
| 0 | 32-BITS |
| 1 | 33-BITS |
| 2 | 34-BITS |
| 3 | 35-BITS |
| −1 | 31-BITS |
| −2 | 30-BITS |
| −3 | 29-BITS |

PIXEL CLOCK AND PULSE-MODULATION-SIGNAL GENERATING DEVICE, OPTICAL SCANNER, AND IMAGE FORMING APPARATUS

CROSS-REFERENCE TO RELATED APPLICATIONS

This patent application is a Continuation of U.S. patent application Ser. No. 11/030,419, filed on Jan. 7, 2005 and further claims priority to Japanese Patent Application No. 2004-001982, filed in Japan on Jan. 7, 2004. The contents of these applications are incorporated herein by reference in their entirety.

BACKGROUND OF THE INVENTION

1) Field of the Invention

The present invention relates to a technology for generating a pixel clock in a laser printer, a digital copying machine, and other image forming apparatuses, and for generating a pulse modulation signal as a laser drive signal.

2) Description of the Related Art

FIG. 16 is a general configuration diagram of an image forming apparatus such as a laser printer and a digital copying machine. As shown in FIG. 16, a semiconductor laser unit 1001 emits a laser beam, a rotary polygon mirror 1002 scans the laser beam, and laser beam passes a scan lens 1003 to form a light spot on a photosensitive element element 1004 as a scanned medium, thereby exposing the photosensitive element 1004 to form an electrostatic latent image. Here, based on a signal output for each line from a photodetector 1005, a phase-synchronized image clock (a pixel clock) is generated for each one line, and is supplied to an image processing unit 1006 and a laser drive circuit 1007 respectively. The semiconductor laser unit 1001 controls the time of emitting a semiconductor laser beam in this way, following image data generated by the image processing unit 1006 and the image clock of which phase is set for each one line by a phase synchronizing circuit 1009. With this arrangement, the semiconductor laser unit 1001 controls the electrostatic latent image on the scanned medium 1004.

In this scan optical system, a variance in the distance from a polarizer such as a polygon scanner to a rotation axis of a polarization reflection plane generates unevenness in the scan speed of a light spot (a scan beam) that scans a scanned surface. This scan speed unevenness generates fluctuation in the image, and degrades image quality. When high-definition image is required, it is necessary to correct the scan unevenness.

In a multi-beam optical system, when oscillation wavelengths of lights emitted from various light sources are different, an exposure positional deviation occurs in the optical system in which chromatic aberration of the scan lens is not corrected. When a spot light from each light emission source scans the scanned medium, scan widths of lights become different between those from different light emission sources. This difference in scan widths degrades the image quality, therefore the scan widths must be corrected.

Conventionally, to correct scan unevenness and the like, a light spot position along a scan line is controlled by changing a frequency of a pixel clock. Such a technology is disclosed in, for example, Japanese Patent Application Laid-Open Nos. H11-167081 and Japanese Patent Application Laid-Open No. 2001-228415. In another method, a scan variance is corrected by controlling a phase of a pixel clock. Such a technology is disclosed in, for example, Japanese Patent Application Laid-Open No. 2003-98465. There is also a method of achieving fine and high gradation of an image even when an operation speed is fast, by optionally generating a pulse modulation signal having a desired pattern as a laser drive signal. Such a technology is disclosed in, for example, Japanese Patent Application Laid-Open No. 2003-103831.

However, according to the conventional system (the frequency modulation system) of changing a frequency of a pixel clock, configuration of a pixel clock controller is generally complex. This complexity increases along a gradual fining of a frequency modulation width, therefore a fine control can not be carried out. According to the conventional system of controlling a phase of a pixel clock or the conventional system of generating a pulse modulation signal in a desired pattern, the control is carried out individually, therefore the length of one pixel can not be controlled in high precision.

SUMMARY OF THE INVENTION

It is an object of the present invention to solve at least the above problems in the conventional technology.

A pixel clock and pulse-modulation-signal generating device according to one aspect of the present invention includes a high-frequency-clock generating unit that generates a high-frequency clock; a modulation-data generating unit that generates, based on pixel control data that specifies a pixel length and image data, phase data that indicates a transition timing of a pixel clock and modulation data that indicates a desired bit pattern that corresponds to the image data; a pixel-clock generating unit that generates a pixel clock based on the high-frequency clock, the phase data, and a horizontal synchronization signal; and a serial-modulation-signal generating unit that inputs the modulation data, and outputs a pulse modulation signal in a serial pulse string based on the high-frequency clock.

An optical scanner according to another aspect of the present invention makes a polarizer scan, on a scanned medium along a scan direction, an optical flux output from a light source, and includes a pixel clock and pulse-modulation-signal generating device according to the above aspect.

An image forming apparatus according to still another aspect of the present invention forms an image using an optical scanner according to the above aspect as an exposing unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5A and FIG. 5B are waveform diagrams of a relationship among a high-frequency clock, a pixel clock, and phase data;

FIG. 6 is a table of a relationship between phase data and phase shift amount;

DETAILED DESCRIPTION

Exemplary embodiments of a pixel clock and pulse-modulation-signal generating device, an optical scanner, and an image forming apparatus according to the present invention will be explained in detailed with reference to the accompanying drawings.

Figure 1B:
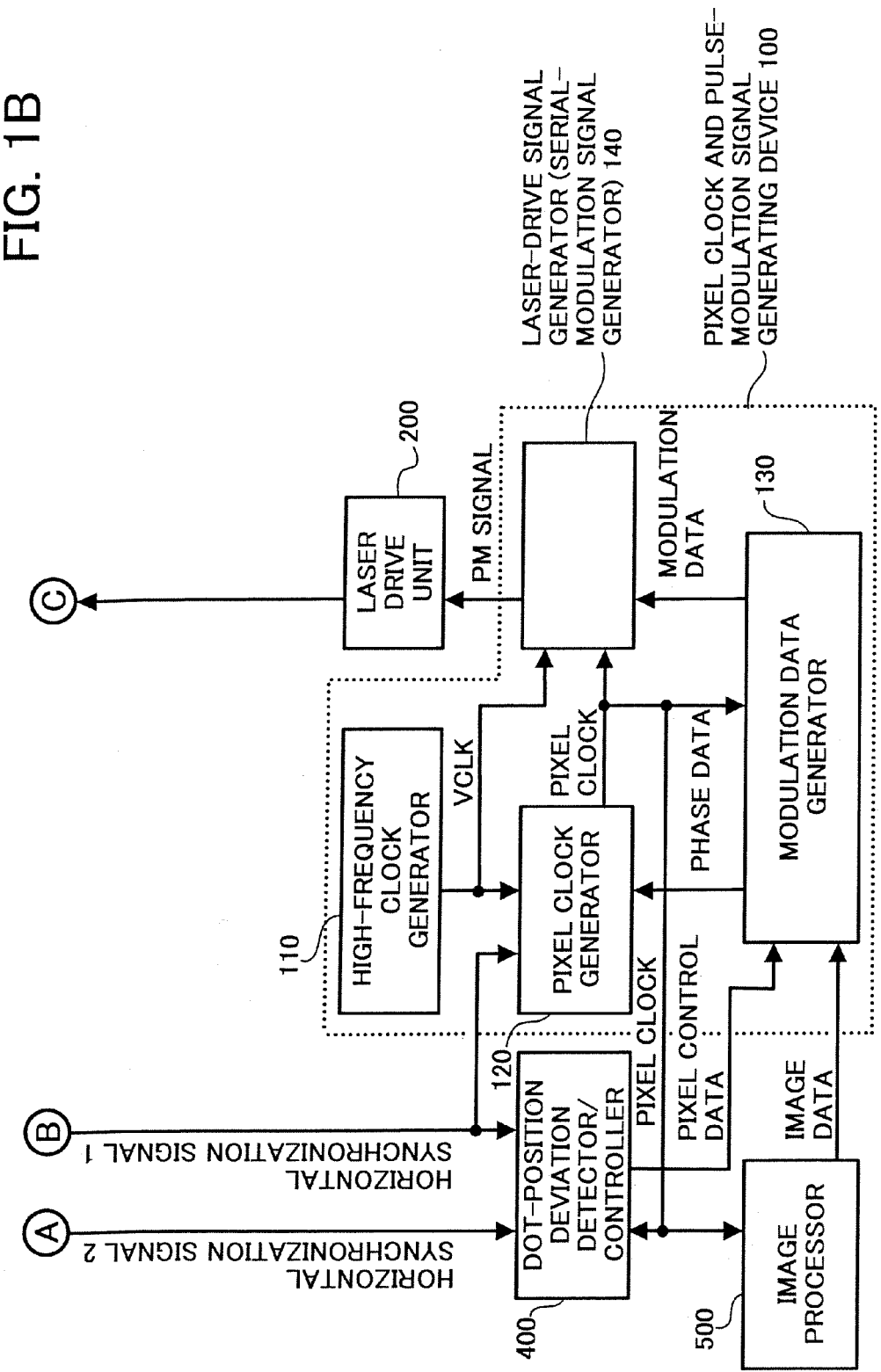
FIG. 1 is a drawing showing the combination of FIG. 1A that illustrates a showing of optical scanning elements and FIG. 1B that illustrates a pixel clock and pulse-modulation-signal generating device and associated components according to one embodiment of the present invention.

FIGS. 1A and 1B together (as shown by FIG. 1) show a total configuration diagram of an example of an image forming system to which a pixel clock and pulse-modulation-signal generating device is applied according to the present invention. In FIG. 1B, a reference numeral 100 denotes the pixel clock and pulse-modulation-signal generating device, and includes a high-frequency clock generator 110, a pixel clock generator 120, a modulation data generator 130, and a laser-drive signal generator (serial-modulation signal generator) 140. A reference numeral 200 denotes a laser drive unit, 400 denotes a dot-position deviation detector/controller, and 500 denotes an image processor. A pixel clock generated by the pixel clock generator 120 is supplied to the modulation data generator 130, the laser-drive signal generator 140, the dot-position deviation detector/controller 400, and the image processor 500.

In the scan optical system 300 of FIG. 1A, a laser beam from a semiconductor laser 301 passes through a collimator lens 302, and a cylinder lens 303. A polygon mirror 304 scans the laser beam, which passes through an fθ lens 306. A half-mirror 310 reflects (partially transmits) the laser beam, which passes through a toroidal lens 307, and is incident to a photosensitive element 305, thereby forming an image (an electrostatic latent image) on a scanned surface of the photosensitive element 305. A photodetector A308 and a photodetector B309, disposed on a detected surface having a time correlation with the scanned surface, detect a start point and an end point of a transmission light of the scan laser beam on a half-mirror 310, and input them as horizontal synchronization signals 1 and 2, respectively, via the labeled connections "A" and "B," to the dot-position deviation detector/controller 400 shown in FIG. 1B. The dot-position deviation detector/controller 400 measures time taken to scan the laser beam between the photodetector A308 and the photodetector B309, compares the measured time with a predetermined reference time, thereby obtaining a deviation. In order to correct this deviation, the dot-position deviation detector/controller 400 generates pixel control data to assign a pixel length, and gives the pixel control data to the modulation data generator 130 in synchronism with the pixel clock. The image processor 500 gives image-processed data to the modulation data generator in synchronism with the pixel clock. The modulation data generator 130 generates phase data to instruct a transition timing of a high-frequency clock and the pixel clock, and modulation data, based on pixel control data and image data. The modulation data generator 130 outputs the phase data to the pixel clock generator 120 and outputs the modulation data to the laser-drive signal generator 140, in synchronism with the pixel clock, respectively. The high-frequency clock generator 110 generates and outputs a high-frequency clock VCLK that becomes a basis of the pixel clock and a pulse modulation signal (a PM signal). The pixel clock generator 120 generates the pixel clock of which cycle changes, based on the high-frequency clock VCLK and the phase data. This pixel clock is output in synchronism with a horizontal synchronization signal 1. The laser-drive signal generator 140 generates a serial pulse modulation signal (a PM signal) from the high-frequency clock VCLK, a pixel clock PCLK, and modulation data, and drives the semiconductor laser 301 of FIG. 1A via a laser drive unit 200 coupled to semiconductor laser 301 via the labeled connection "C." The laser-drive signal generator 140 is hereinafter referred to as a serial-modulation signal generator (circuit).

As described later, the modulation data generator 130 adds data to modulation data when a pixel length is to be increased, and deletes data from the modulation data when a pixel length is to be decreased. With this arrangement, a serial pulse modulation signal that is output from the serial-modulation signal generator 140 can have a changed length of one pixel. As a result, scan speed unevenness and a dot positional deviation can be corrected. Consequently, an image free from fluctuation in the scan width can be formed on the photosensitive element 305.

Figure 2:
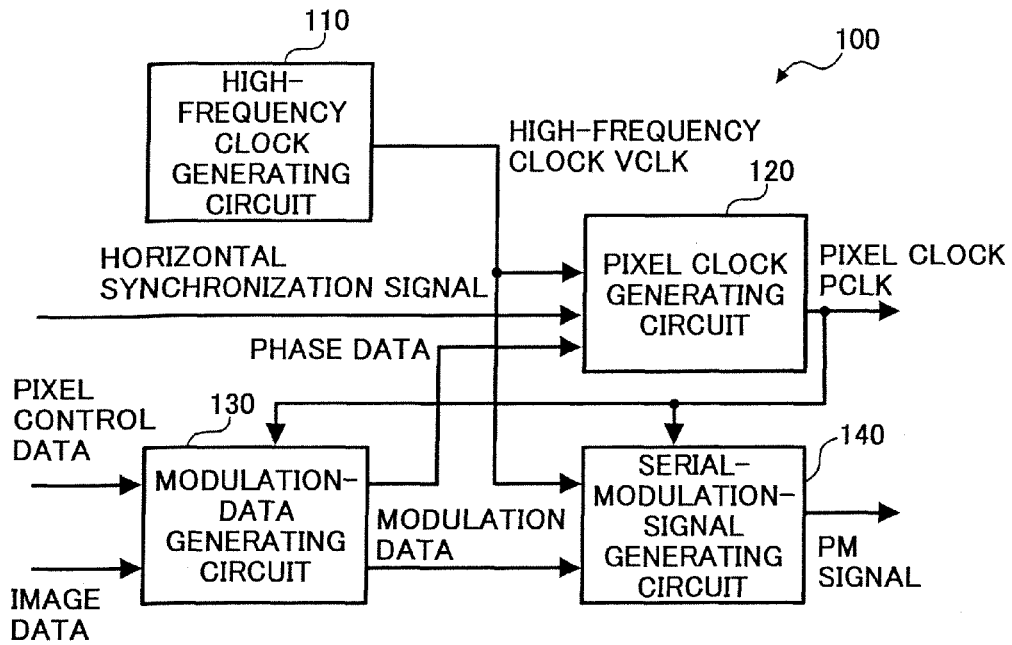
FIG. 2 is a basic configuration diagram of the pixel clock and pulse-modulation-signal generating device according to the present invention.

FIG. 2 is a configuration diagram of the pixel clock and pulse-modulation-signal generating device according to one embodiment of the present invention. FIG. 2 is a partially modified expression of a part of the block 100 shown in FIG. 1B (for example, the high-frequency clock generator is changed to a high-frequency clock generating circuit).

Figure 3:
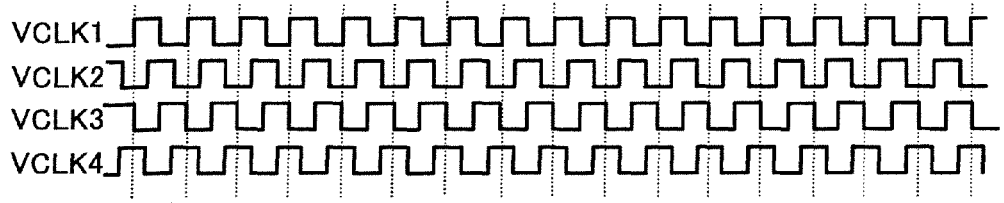
FIG. 3 is a waveform diagram of one example of a high-frequency clock that becomes a basis of a pixel clock and a pulse modulation signal.

In FIG. 2, the high-frequency clock generating circuit 110 generates the high-frequency clock VCLK that becomes a basis of the pixel clock PCLK and the pulse modulation signal (PM signal). The high-frequency clock generating circuit 110 generates four-phase high-frequency clocks VCLK1 to VCLK4, with their phases deviated by a quarter of one cycle respectively, as shown in FIG. 3. The high-frequency clock generating circuit 110 gives only the clock VCLK1 or the clocks VCLK1 plus VCLK3 to the pixel clock generating circuit 120, and gives the whole clocks VCLK1 to VCLK4 to the serial-modulation-signal generating circuit 140.

Figure 4:
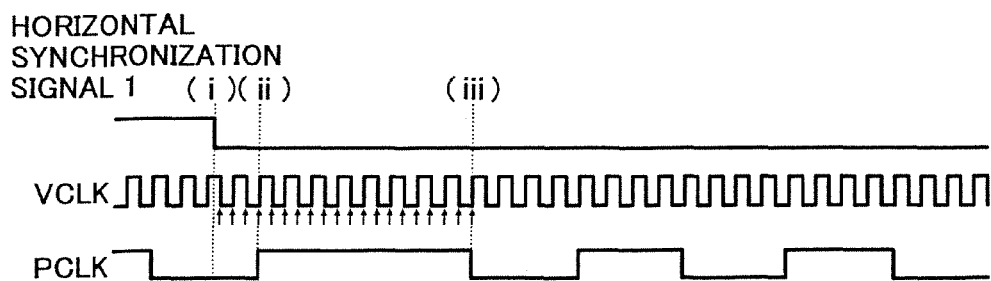
FIG. 4 is a waveform diagram of a relationship among a high-frequency clock, a horizontal synchronization signal, and a pixel clock.

The pixel clock generating circuit 120 generates the pixel clock PCLK from the high-frequency clock VCLK (for example, VCLK1) from the high-frequency clock generating circuit 110, the horizontal synchronization signal 1 detected by the photodetector A308, and the phase data from the modulation-data generating circuit 130. The pixel clock PCLK is output in synchronism with the horizontal synchronization signal 1, and is output by changing the cycle for each one clock of PCLK based on the phase data. FIG. 4 and FIGS. 5A and 5B are waveform diagrams of one example of a pixel clock generated by the pixel clock generating circuit 120. In FIG. 4 and FIGS. 5A and 5B, the pixel clock PCLK is expressed as a clock obtained by dividing the frequency of the high-frequency clock VCLK into eight, as a normal case.

FIG. 4 is a waveform diagram of a relationship among the high-frequency clock VCLK, the horizontal synchronization signal 1, and the pixel clock PCLK. When the horizontal synchronization signal 1 falls (as shown by (i) in FIG. 4), the pixel clock PCLK temporarily becomes an "H" fixed status (as shown by (ii) in FIG. 4). After VCLK changes by a preset number of times (20 in this case) since the fall of the horizontal synchronization signal 1 (as shown by (iii) in FIG. 4), the pixel clock PCLK becomes an "L" status and the output of the clock is started again. With this arrangement, an interval between (i) and (iii) in FIG. 4 always becomes constant in the precision of a half cycle of VCLK.

FIGS. 5A and 5B are waveform diagrams of a relationship among the high-frequency clock VCLK, the phase data, and the pixel clock PCLK. FIG. 6 is a table of a relationship between phase data and phase shift amount of the pixel clock PCLK shown in FIGS. 5A and 5B. In FIG. 5A, for example, the phase data is "1" at (i), and the phase of the pixel clock PCLK is advanced by $1/16$ PCLK to have a long cycle. At (ii) in FIG. 5A, the phase data is "2", and the phase of the pixel clock PCLK is advanced by $2/16$ PCLK to have a long cycle. Similarly, at (iv) in FIG. 5B, the phase data is "−1", and the phase of the pixel clock PCLK is delayed by $1/16$ to have a short cycle. At (v) in FIG. 5B, the phase data is "−2", and the phase f the pixel clock PCLK is delayed by $2/16$ to have a short cycle.

As described above, the pixel clock generating circuit 120 outputs the pixel clock PCLK of which cycle becomes long or short for each one clock following the phase data. A circuit described in Japanese Patent Application Laid-Open No. 2003-98465, for example, can be used for the pixel clock generating circuit 120.

Figure 7:
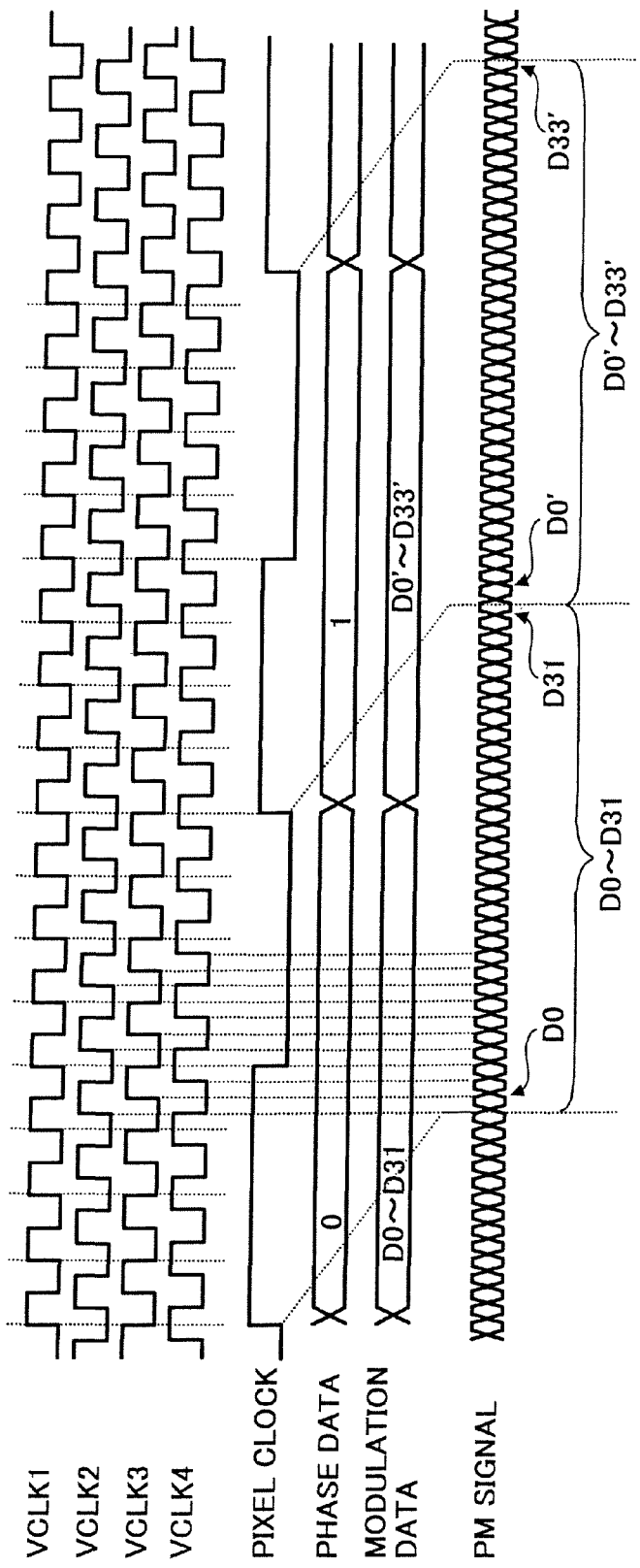
FIG. 7 is a waveform diagram of an output pulse modulation signal according to the present invention.
Figures 8, 9:
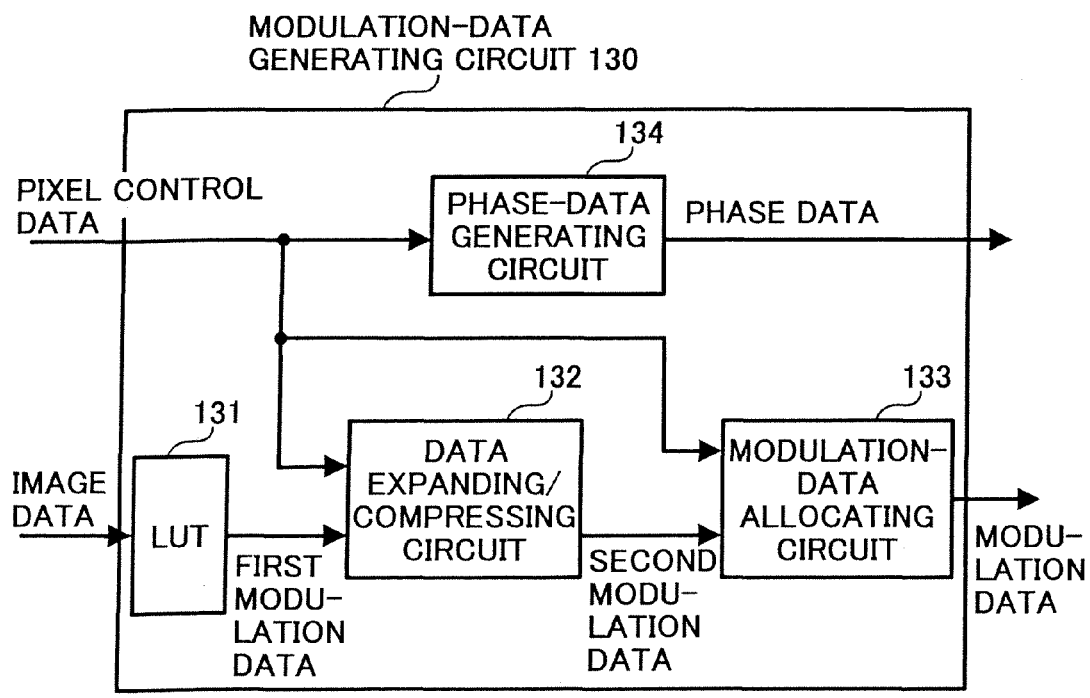
FIG. 8 is a table of a relationship between phase data and modulation data.
FIG. 9 is a configuration diagram of a modulation-data generating circuit according to one embodiment of the present invention.

In FIG. 2, the serial-modulation-signal generating circuit 140 converts parallel modulation data (that expresses a desired bit pattern corresponding to image data) given from the modulation-data generating circuit 130 into serial data, and outputs the result as the serial pulse modulation signal (PM signal), based on the high-frequency clock VCLK from the high-frequency clock generating circuit 110 and the pixel clock PCLK from the pixel clock generating circuit 120. FIG. 7 is a waveform diagram of the output of the PM signal. The four clocks VCLK1 to VCLK4, of which phases are deviated, shown in FIG. 3, are given as the high-frequency clocks. The modulation data (D0 to D37) each have a 38-bit width as a maximum. For the pulse modulation signal (PM signal), modulation data of each bit are sequentially output at the rise of each clock of VCLK1 to VCLK4. The PM signal takes a pulse string having a length corresponding to the phase shift amount of the pixel clock PCLK. In other words, in FIG. 7, when the phase data is "0", 32-bit modulation data of D0 to D31 are converted into serial data, and the result is output as the PM signal. When the phase data is "1", 34-bit modulation data of D0 to D33 are converted into serial data, and the result is output as the PM data. This similarly applies to other phase data. FIG. 8 is a table of a relationship between the phase data and the modulation data that is output as the PM data. The serial-modulation-signal generating circuit 140 is basically configured by a shift register. A circuit described in Japanese Patent Application Laid-Open No. 2003-103831, for example, can be used for the serial-modulation-signal generating circuit 140.

In FIG. 2, the modulation-data generating circuit 130 generates modulation data and phase data, based on pixel control data to assign a length of one pixel from the dot-position deviation detector/controller 400 and image data from the image processor 500, and outputs the modulation data and the phase data in synchronism with the pixel clock PCLK. The modulation-data generating circuit 130 expands or compresses the modulation data based on the pixel control data.

FIG. 9 is a configuration diagram of an example of the modulation-data generating circuit 130. A lookup table (LUT) 131 stores modulation data that expresses a desired bit pattern corresponding to image data (see Japanese Patent Application Laid-Open No. 2003-103831, for example). The modulation-data generating circuit 130 first obtains the modulation data (which is called first modulation data) corresponding to the input image data, from the LUT 131 using the image data as an address. A data expanding/compressing circuit 132 adds data to or deletes data from the first modulation data based on pixel control data, to obtain and output second modulation data.

Figure 10:
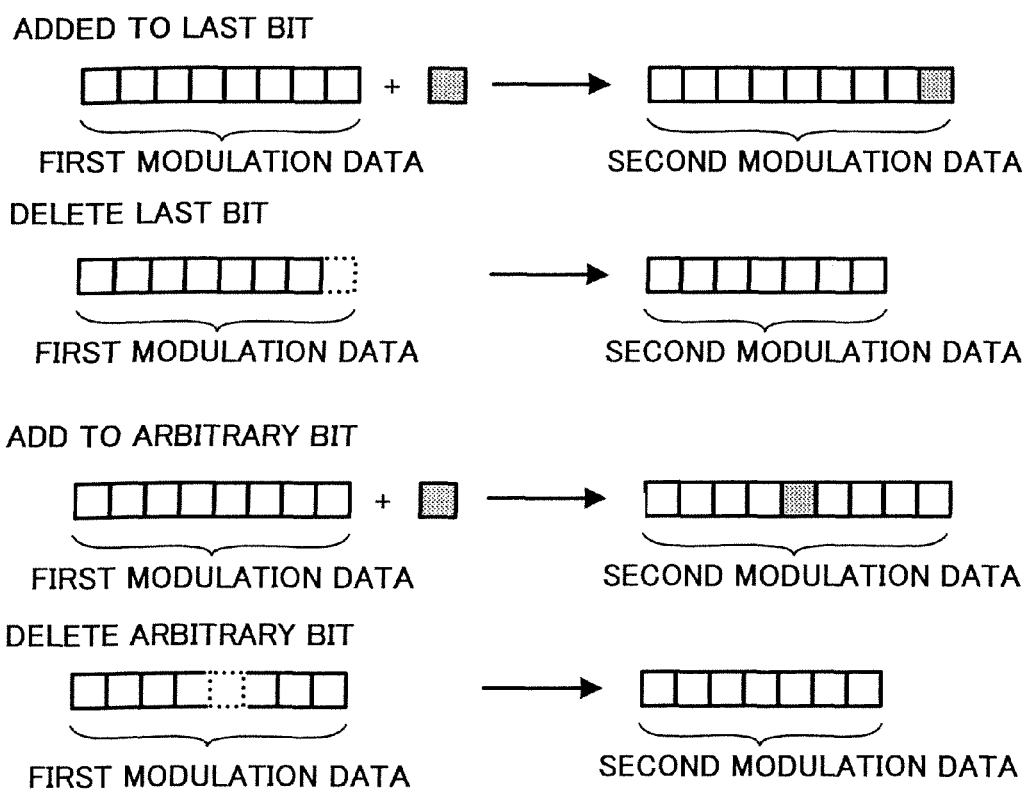
FIG. 10 is an explanatory diagram of a state of addition and deletion of modulation data according to the present invention.

Data can be added or deleted by adding the data to the last bit of the first modulation data or deleting the last bit from the first modulation data, as shown in FIG. 10. Alternatively, data can be added to an arbitrary bit of the first modulation data, or an arbitrary bit can be deleted from the first modulation data. The system of adding data to or deleting data from the last bit of the first modulation data can increase or shorten the length of one pixel in a simple configuration. The system of adding data to or deleting data from an arbitrary bit of the first modulation data can flexibly configure the circuit. A bit to which data is added or from which data is deleted can be determined corresponding to a data pattern of the modulation data. This system can increase or shorten the length of one pixel by minimizing a change in the concentration of one pixel. When data is added, a data pattern of the added data can depend on the data pattern of the modulation data. With this arrangement, for example, a change in the ratio of a black pattern of the modulation data can be made small.

A modulation data allocating circuit 133 allocates each bit of the second modulation data to each bit of the modulation data as output based on the pixel control data, and outputs it as the modulation data. At the same time, a phase data generating circuit 134 outputs phase data based on the pixel control data. While a data line of the pixel clock PCLK is omitted from FIG. 9 to simplify the diagram, the modulation data and the phase data are output in synchronism with the pixel clock.

Figure 11:
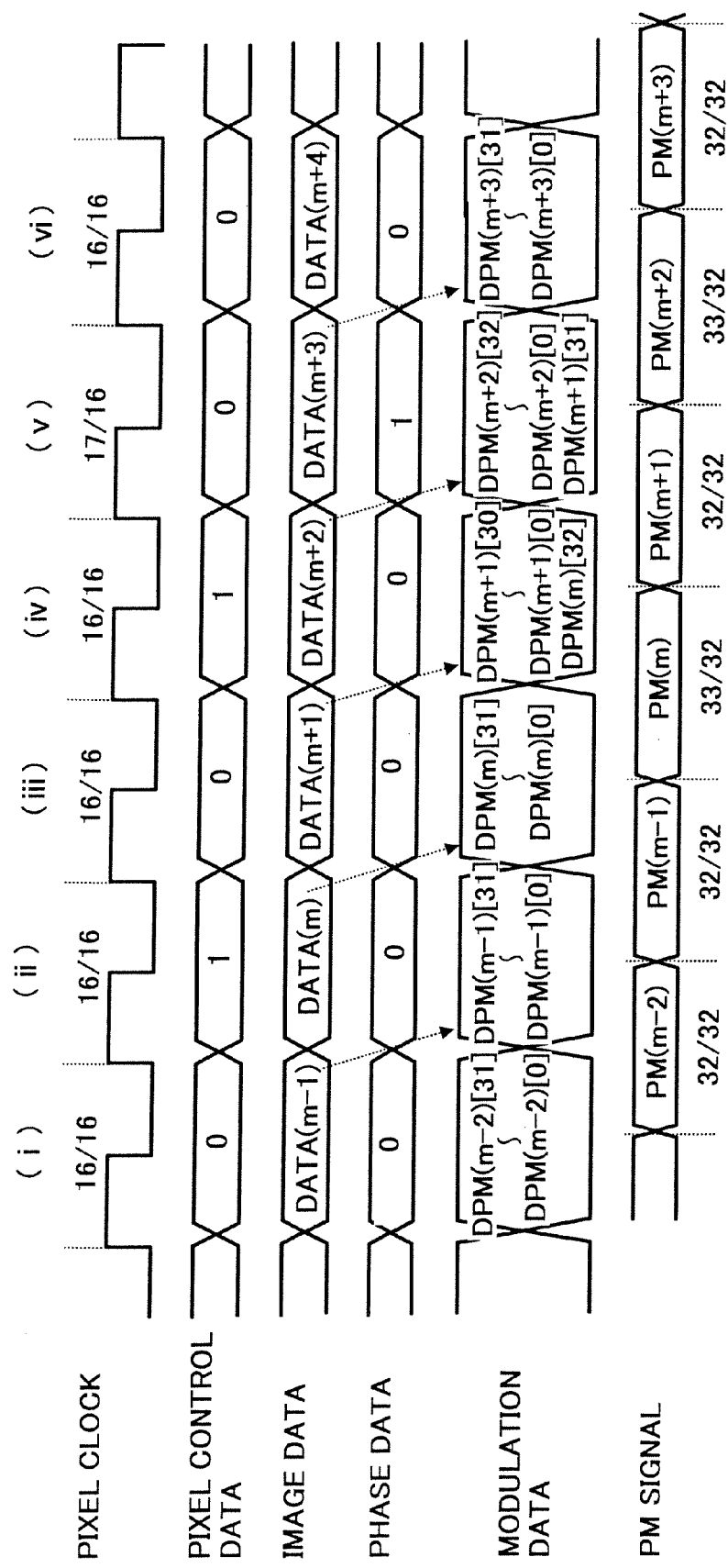
FIG. 11 is a waveform diagram of output modulation data and output phase data (a case of a large pixel-length) according to the present invention.
Figure 12:
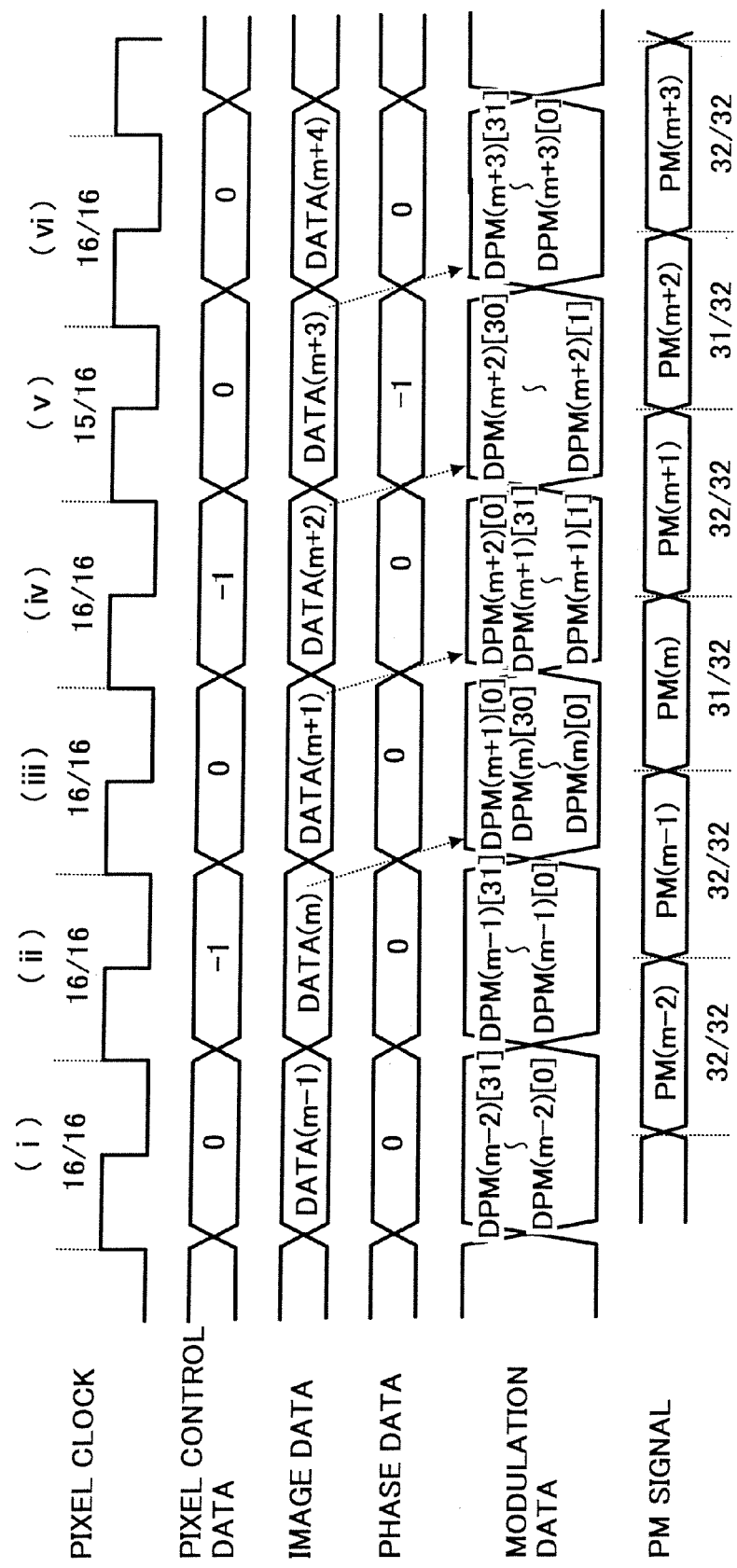
FIG. 12 is a waveform diagram of output modulation data and output phase data (a case of a short pixel-length) according to the present invention.
Figures 13, 14:
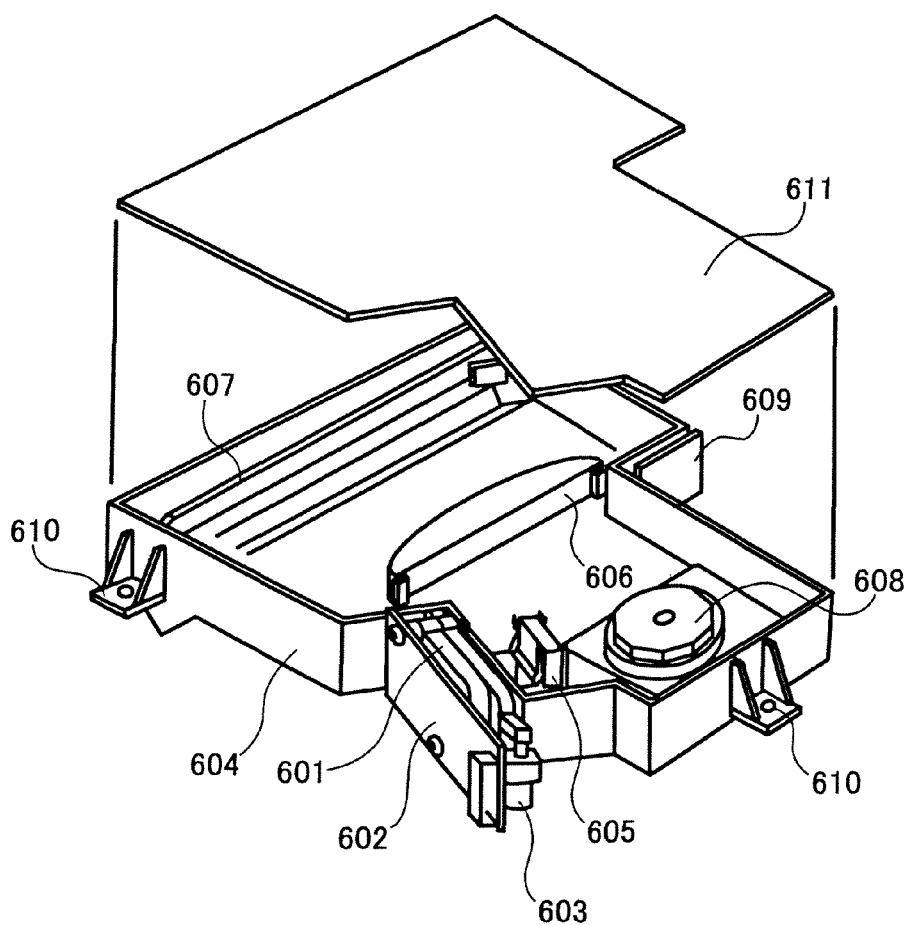
FIG. 13 is a table of a relationship between pixel control data and a length of one pixel.
FIG. 14 is a configuration diagram of one example of an optical scanner mounted with the pixel clock and pulse-modulation-signal generating device according to the present invention.

FIG. 11 and FIG. 12 are waveform diagrams of the modulation data and the phase data that are output. Usually, the modulation data has 32 bits, and a relationship between the pixel control data and a length of one pixel of the data is as shown in FIG. 13. The relationship between the phase data and the phase shift amount of the pixel clock PCLK is as shown in FIG. 6.

The modulation data and the phase data shown in FIG. 11 are explained next, where data is added to the modulation data to have an increased length of one pixel.

At a clock of (i) in FIG. 11, the pixel control data is "0", and therefore, 32-bit data of DPM (m−1) [31:0] is obtained for the second modulation data corresponding to image data DATA (m−1), and DPM (m−1) [0] to DPM (m−1) [31] are output to the modulation data D0 to D31 respectively at a clock of (ii). At the clock of (ii) in FIG. 11, the pixel control data is "1", and therefore, 33-bit data of DPM (m) [32:0] is obtained for the second modulation data corresponding to image data DATA (m). Then, DPM (m) [0] to DPM (m) [31] are output to the modulation data D0 to D31 respectively at a clock of (iii). DPM (m) [32] is output to the modulation data D0 at a clock of (iv). At the clock of (iii) in FIG. 11, the pixel control data is "0", and therefore, 32-bit data of DPM (m+1) [31:0] is obtained for the second modulation data corresponding to image data DATA (m+1). Then, DPM (m) [32] is output to the modulation data D0, and DPM (m+1) [0] to DPM (m+1) [30] are output to D1 to D31 respectively, at a clock of (iv). DPM (m+1) [31] is output to the modulation data D0 at a clock of (v). At the clock of (iv) in FIG. 11, the pixel control data is "1", and therefore, 33-bit data of DPM (m+2) [32:0] is obtained for the second modulation data corresponding to image data DATA (m+2). Then, "1" is output for the phase data at the clock of (v). A phase shift occurs in the clock of (v) because the phase data is "1", and this clock becomes long. Therefore, a modulation data width also increases, and the modulation data become D0 to D33. Accordingly, DPM (m+1) [31] is output to the modulation data D0, and DPM (m+2) [0] to DPM (m+2) [32] are output to the modulation data D1 to D33 respectively, at the clock of (v). At the clock of (v) in FIG. 11, the pixel control data is "0", and therefore, 32-bit data of DPM (m+3) [31:0] is obtained for the second modulation data corresponding to image data DATA (m+3). Then, DPM (m+3) [0] to DPM (m+3) [31] are output to the modulation data D1 to D31 respectively, at a clock of (vi).

The phase data and the modulation data are output, and the phase data is given to the pixel clock generating circuit 120 and the modulation data is given to the serial-modulation-signal generating circuit 140, as shown in FIG. 11. As a result, the length of one pixel can be increased in the 1/32 pixel width.

The modulation data and the phase data shown in FIG. 12 are explained next, where data is deleted from the modulation data to shorten the length of one pixel.

At a clock of (i) in FIG. 12, the pixel control data is "0", and therefore, 32-bit data of DPM (m−1) [31:0] is obtained for the second modulation data corresponding to image data DATA (m−1), and DPM (m−1) [0] to DPM (m−1) [31] are output to the modulation data D0 to D31 respectively at a clock of (ii). At the clock of (ii) in FIG. 12, the pixel control data is "−1", and therefore, 31-bit data of DPM (m) [30:0] is obtained for the second modulation data corresponding to image data DATA (m). Then, DPM (m) [0] to DPM (m) [30] are output to the modulation data D0 to D30 respectively, and the modulation data DPM (m+1) [0] corresponding to the next image data DATA (m+1) is output to D31 at a clock of (iii). At the clock of (iii) in FIG. 12, the pixel control data is "0", and therefore, 32-bit data of DPM (m+1) [31:0] is obtained for the second modulation data corresponding to image data DATA (m+1). Since DPM (m+1) [0] is output to the modulation data D31 one before, DPM (m+1) [1] to DPM (m+1) [31] are output to D0 to D30 respectively, and the modulation data DPM (m+2) [0] corresponding to the next image data DATA (m+2) is output to D31, at a clock of (iv). At the clock of (iv) in FIG. 12, the pixel control data is "−1", and therefore, 31-bit data of DPM (m+2) [30:0] is obtained for the second modulation data corresponding to image data DATA (m+2). Then, "−1" is output for the phase data at a clock of (v). A phase shift occurs in the clock of (v) because the phase data is "−1", and this clock becomes short. Therefore, a modulation data width also becomes short, and the modulation data become D0 to D29. Since DPM (m+2) [0] is output to the modulation data D31 one before, DPM (m+2) [1] to DPM (m+2) [30] are output to D0 to D29 respectively, at the clock of (v). At the clock of (v) in FIG. 12, the pixel control data is "0", and therefore, 32-bit data of DPM (m+3) [31:0] is obtained for the second modulation data corresponding to image data DATA (m+3). Then, DPM (m+3) [0] to DPM (m+3) [31] are output to the modulation data D1 to D31 respectively, at a clock of (vi).

The phase data and the modulation data are output, and the phase data is given to the pixel clock generating circuit 120 and the modulation data is given to the serial-modulation-signal generating circuit 140, as shown in FIG. 12. As a result, the length of one pixel can be shortened in the 1/32 pixel width.

As explained above, according to the present embodiment, the length of one pixel can be set long or short at a fine step of 1/32 pixel. Therefore, a dot positional deviation can be corrected in finer precision.

FIG. 14 is a configuration diagram of one example of an optical scanner mounted with the pixel clock and pulse-modulation-signal generating device according to the present invention. A printed board 602, on which a drive circuit and a pixel clock and pulse-modulation-signal generating device that control a semiconductor laser are formed, is mounted on the back surface of a light-source unit 601. The printed board 602 is brought into contact with a wall surface of an optical housing that is orthogonal with an optical axis with a spring. An adjusting screw 603 adjusts the inclination of the printed board 602 to keep posture. The adjusting screw 603 is engaged with a projection formed on the wall surface of the housing. A cylinder lens 605, a polygon motor 608 that rotates a polygon mirror, an fθ lens 606, a toroidal lens (not shown), and a reflection mirror 607 are positioned and held inside the optical housing. A printed board 609 on which a synchronization detection sensor is installed is mounted on the wall surface of the housing from the outside, like the light-source unit. The optical housing seals an upper part with a cover 611, and is fastened to a frame member of an image forming apparatus, with plural fittings 610 projected from the wall surface.

Figure 15:
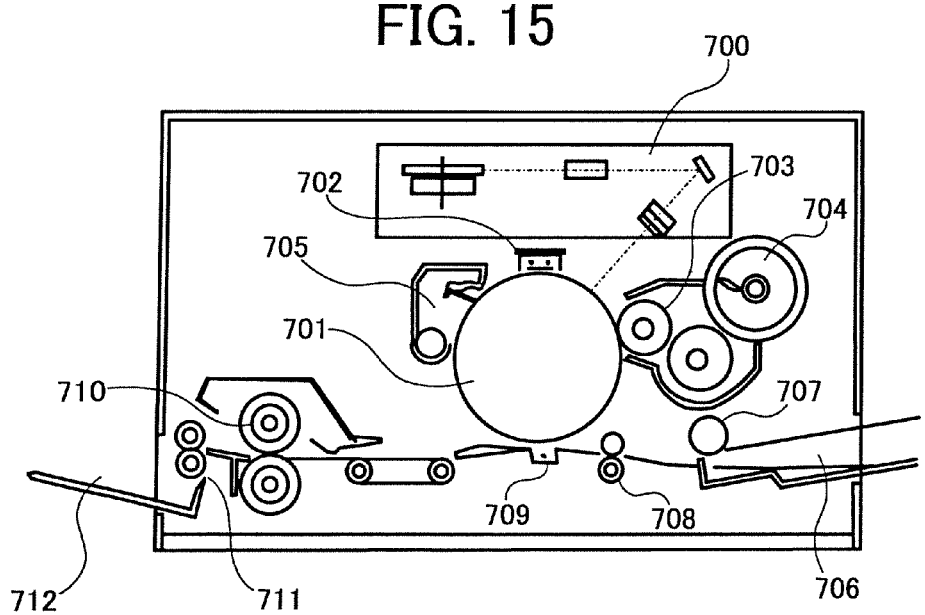
FIG. 15 is a configuration diagram of one example of an image forming apparatus mounted with the optical scanner.
Figure 16:
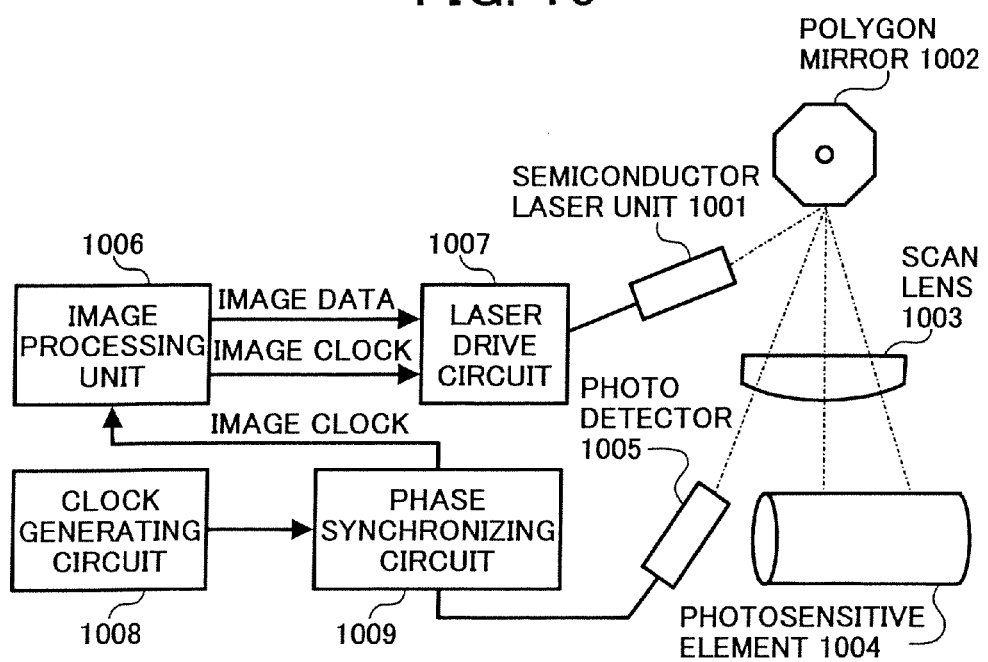
FIG. 16 is a total configuration diagram of a conventional image forming apparatus.

FIG. 15 is a configuration diagram of one example of the image forming apparatus mounted with the optical scanner shown in FIG. 14. A charger 702 that charges a photosensitive element at a high voltage, a development roller 703 that develops an electrostatic latent image recorded by an optical scanner 700, by adding a charged toner to the electrostatic latent image, a toner cartridge 704 that supplies a toner to a developing roller, and a cleaning case 705 that scrapes and stores the toner remaining on a drum, are disposed around a photosensitive drum 701 as scanned surface. A latent image of plural lines is recorded simultaneously for each surface onto the photosensitive drum 701. Recording paper is fed from a paper feeding tray 706 with a paper feeding roller 707. A pair of resist rollers 708 feed the recording paper by matching a record start timing in a sub-scan direction. When the paper passes through the photosensitive drum 701, a transfer charger 709 transfers a toner image. A fixing roller 710 fixes the image, and a paper discharge roller 711 discharges the printed paper to a catch tray 712.

According to the present invention, it is possible to control a length of one pixel in high precision, and to correct a scan width fluctuation in high precision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:
1. A pixel clock and pulse-modulation-signal generating device comprising:

a high-frequency-clock generating unit that generates a high-frequency clock;

a pixel control data generating unit configured to generate pixel control data that specifies a pixel length to correct fluctuation in a scan width of a scan optical system;

a modulation-data generating unit configured to generate, based on the pixel control data, phase data that indicates a phase shift amount of a pixel clock, generate modulation data that indicates a desired bit pattern that corresponds to image data, and change a length of the modulation data based on the pixel control data;

a pixel-clock generating unit configured to generate the pixel clock based on the high-frequency clock, the phase data, and a horizontal synchronization signal; and a serial-modulation-signal generating unit configured to receive the modulation data, and output a pulse modulation signal in a serial pulse string based on the pixel clock and the high-frequency clock, the serial pulse string having a length corresponding to the phase shift amount of the pixel clock indicated by the phase data.

2. The pixel clock and pulse-modulation-signal generating device according to claim 1, wherein the modulation-data generating unit adds data to or deletes data from the modulation data based on the pixel control data.

3. The pixel clock and pulse-modulation-signal generating device according to claim 2, wherein data is added to the modulation data at a last part of the modulation data when a length of a pixel is to be increased.

4. The pixel clock and pulse-modulation-signal generating device according to claim 3, wherein the data added depends on a pattern of the modulation data.

5. The pixel clock and pulse-modulation-signal generating device according to claim 2, wherein data positioned at a last part of the modulation data is deleted when a length of a pixel is to be shortened.

6. The pixel clock and pulse-modulation-signal generating device according to claim 5, wherein the data added depends on a pattern of the modulation data.

7. The pixel clock and pulse-modulation-signal generating device according to claim 1, wherein the modulation-data generating unit is configured to divide, in accordance with the phase shift amount of the pixel clock indicated by the phase data, plural pieces of data constituting the modulation data whose length changes based on the pixel control data into two groups, and to output the two groups at two consecutive pixel clocks, respectively.

8. An optical scanner that makes a polarizer scan, on a scanned medium along a scan direction, an optical flux output from a light source, the optical scanner comprising a pixel clock and pulse-modulation-signal generating device that includes:

a high-frequency-clock generating unit that generates a high-frequency clock;

a pixel control data generating unit configured to generate pixel control data that specifies a pixel length to correct fluctuation in a scan width of a scan optical system;

a modulation-data generating unit configured to generate, based on the pixel control data, phase data that indicates a phase shift amount of a pixel clock, generate modulation data that indicates a desired bit pattern that corresponds to image data, and change a length of the modulation data based on the pixel control data;

a pixel-clock generating unit configured to generate the pixel clock based on the high-frequency clock, the phase data, and a horizontal synchronization signal; and a serial-modulation-signal generating unit configured to receive the modulation data, and output a pulse modulation signal in a serial pulse string based on the pixel clock and the high-frequency clock, the serial pulse string having a length corresponding to the phase shift amount of the pixel clock indicated by the phase data.

9. An image forming apparatus that forms an image using an optical scanner as an exposing unit, wherein the optical scanner makes a polarizer scan, on a scanned medium along a scan direction, an optical flux output from a light source, and includes a pixel clock and pulse-modulation-signal generating device that includes, a high-frequency-clock generating unit that generates a high-frequency clock;

a pixel control data generating unit configured to generate pixel control data that specifies a pixel length to correct fluctuation in a scan width of a scan optical system;

a modulation-data generating unit configured to generate, based on the pixel control data, phase data that indicates a phase shift amount of a pixel clock, generate modulation data that indicates a desired bit pattern that corresponds to image data, and change a length of the modulation data based on the pixel control data;

a pixel-clock generating unit configured to generate the pixel clock based on the high-frequency clock, the phase data, and a horizontal synchronization signal; and a serial-modulation-signal generating unit configured to receive the modulation data, and output a pulse modulation signal in a serial pulse string based on the pixel clock and the high-frequency clock, the serial pulse string having a length corresponding to the phase shift amount of the pixel clock indicated by the phase data.

* * * * *